Patented Sept. 1, 1953

2,650,919

UNITED STATES PATENT OFFICE 2,650,919

BASIC ESTERS OF PHENOTHIAZINE-10-CARBOXYLIC ACID AND SALTS THEREOF

John W. Cusic, Skokie, Ill., assignor to G. D. Searle & Co., Chicago, Ill., a corporation of Illinois No Drawing. Application February 11, 1950, Serial No. 143,829

7 Claims. (Cl. 260—243)

This invention relates to basic esters of disubstituted carbamic acids wherein the nitrogen atom of the carbamic acid is a member of a polycyclic heterocyclic nucleus, to salts of such esters and to methods of producing such esters and salts. More particularly this invention relates to basic esters of the following general formula

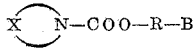

wherein X represents the elements which with N form a nitrogen-containing heterocycle, R is an aliphatic hydrocarbon radical and B is a nonaromatic amino radical.

The compounds of this invention are useful as medicinal agents. Certain of them are antispasmodic drugs, while others are coronary dilators and vasodilators, and still others are adrenolytic and anticholinergic agents. They may be used in the form of the free bases, but preferably are used as acid addition or quaternary ammonium salts. The salts are generally crystalline solids which are usually soluble in water and therefore constitute a preferred embodiment of this invention.

In the foregoing structural formula the polycyclic heterocyclic nucleus may be derived from phenothiazine, phenoxazine, acridan, dihydrophenazine, tetrahydroisoquinoline, tetrahydroquinoline, carbazole, dodecahydrocarbazole, tetradecahydroacridine, and related nitrogen-containing heterocycles. The hydrocarbon radical, R, includes lower alkylene radicals containing one to five carbon atoms such as methylene, ethylene, propylene, butylene, trimethylene, pentamethylene, and the like. The hydrocarbon radical R may also be a part of a heterocyclic ring which includes the amino substituent represented by B. The amino group B represents secondary and tertiary amino radicals which are nonaromatic in character. It includes monoalkylamino radicals such as methylamino, ethylamino, propylamino, isopropylamino, butylamino, isobutylamino, secondary-butylamino, isoamylamino, hexylamino, isohexylamino, and related radicals. It also includes dialkylamino radicals such as diethylamino, diamylamino, dihexylamino, diisohexylamino, methylpropylamino, methylbutylamino, ethylpropylamino, and similar radicals. The amino group, B, may contain substituted alkyl radicals such as β-hydroxyethyl, β-chloroethyl, γ-hydroxypropyl, β,γ-dihydroxypropyl, β-acetoxyethyl, carboethoxymethyl, β-carboethoxyethyl, β-carbomethoxypropyl, β-bromoethyl, γ-bromopropyl and the like. The amino radical, B, also includes non-aromatic heterocyclic amino radicals such as pyrrolidino, piperidino, morpholino, 4-methylpiperazino, lupetidino, pipecolino, methylpyrrolidino, dimethylpyrrolidino, and related saturated heterocyclic amino radicals. The amino group, B, therefore represents nonaromatic amino radicals derived from amines having dissociation constants in the range of about $10^{-3}$ to $10^{-5}$.

The organic bases of the foregoing type form salts with a variety of inorganic and strong organic acids including sulfuric, phosphoric, hydrochloric, hydrobromic, sulfamic, citric, lactic, maleic, malic, succinic, tartaric, cinnamic, acetic, benzoic, gluconic, oxalic, and related acids. They also form crystalline salts with 8-haloxanthines which have a hydrogen atom in position 7, such as 8-chlorotheophylline, 8-bromotheophylline, 8-iodotheophylline, 8-chloro-1,3-diethylxanthine, 8-bromo-1,3-diethylxanthine, 8-chloroxanthine, 8-bromoxanthine, 8-chloro-3-methylxanthine and 8-bromo-3-methylxanthine. They also form quaternary ammonium salts with a variety of organic esters of sulfuric, hydrohalic, and aromatic sulfonic acids. Among such esters are methyl chloride, ethyl chloride, propyl bromide, butyl chloride, isobutyl bromide, ethyl chloroacetate, β-bromoethyl acetate, methyl β-bromopropionate, ethylene bromohydrin, ethylene chlorohydrin, propylene bromohydrin, benzyl chloride, benzyl bromide, phenethyl bromide, naphthylmethyl chloride, dimethyl sulfate, diethyl sulfate, methyl benzenesulfonate, ethyl toluenesulfonate, propyl toluenesulfonate, ethylene chlorohydrin, propylene chlorohydrin, γ-hydroxypropyl bromide, allyl chloride, methallyl chloride, crotyl bromide, and the like.

The compounds of this invention can be prepared by reacting two or more equivalents of a heterocyclic amine of the type enumerated above with one equivalent of a haloalkyl halocarbonate (also known as haloformate) of the formula

wherein Hal is a halogen atom of atomic number greater than 9 and includes chlorine, bromine and iodine, and wherein Alk is a lower alkylene radical. This reaction is preferably carried out at low temperature (0–25° centigrade) in an inert solvent, with or without an acid-binding agent. The reaction can also be conducted in aqueous medium in the presence of caustic alkali, avoiding an excess of the amine. The resulting haloalkyl disubstituted carbamate has the formula

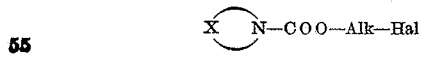

This halogenated ester is then reacted with two or more equivalents of a monoalkyl, dialkyl or saturated heterocyclic amine, generally at temperatures in the range of 50–150° C. The basic ester so formed is removed by conventional procedures and may be purified by distillation or by conversion to a crystalline salt.

The compounds of this invention may also be prepared by reacting a secondary heterocyclic amine of the type recited above with phosgene in an inert solvent to form a substituted carbamyl chloride of the formula

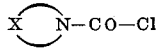

The latter is reacted with an amino alcohol of the formula

HO—R—B generally in an inert solvent at temperatures in the range of 25–150° C.

The following examples illustrate in more detail the present invention without, however, limiting it thereto. The relative quantities of materials are given in parts by weight.

*Example 1*

597 parts of phenothiazine and 429 parts of β-chloroethyl chlorocarbonate in 2640 parts of dry benzene are refluxed for 48 hours. The hot solution is filtered and evaporated. The residue of β-chloroethyl phenothiazine-10-carboxylate is crystallized from alcohol in the presence of activated charcoal. It is a light green compound melting at 142–143° C.

54 parts of β-chloroethyl phenothiazine-10-carboxylate and 18 parts of dimethylamine (as a 50% solution in toluene) are dissolved in 165 parts of methyl ethyl ketone containing 1 part of potassium iodide. The solution is heated at 60–70° C. for 4 days in a closed vessel. It is then chilled and diluted with ether and with dilute hydrochloric acid. The acid layer is separated, made alkaline and extracted with ether. The ether extract is dried and evaporated. The residue of β-dimethylaminoethyl phenothiazine-10-carboxylate is dissolved in warm dry ether, treated with activated charcoal, filtered and cooled. It is stirred and treated dropwise with an equivalent of absolute alcoholic hydrogen chloride. The crystalline precipitate of the hydrochloride of β-dimethylaminoethyl phenothiazine-10-carboxylate is collected on a filter, washed and dried. It melts at 214–215° C. The basic ester has the formula

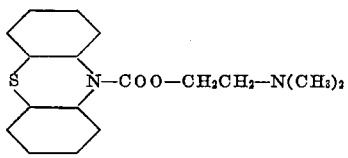

*Example 2*

A solution of 36 parts of β-dimethylaminoethyl phenothiazine-10-carboxylate in 125 parts of methyl ethyl ketone is treated with methyl chloride until 12 parts are taken up. The solution is kept at 50–60° C. for 20 hours in a closed vessel. The precipitate of the crystalline methochloride of β-dimethylaminoethyl phenothiazine-10-carboxylate is collected on a filter and washed with cold methyl ethyl ketone and with warm isopropanol. It melts with decomposition at about 232°.

*Example 3*

457 parts of β-chloroethyl phenothiazine-10-carboxylate and 300 parts of β-methylaminoethanol are dissolved in 1800 parts of methyl ethyl ketone containing 10 parts of sodium iodide. The solution is refluxed for 6 days, then concentrated under vacuum. The residue is agitated with ether and dilute muriatic acid, and the mixture is filtered. The acid layer is separated, made alkaline and extracted with ether. The ether extract is dried and evaporated. The residue of β - (β - hydroxyethyl-methylamino)-ethyl phenothiazine-10-carboxylate is taken up in dry warm benzene-ether, treated with activated charcoal, filtered, cooled and reacted with an equivalent of absolute alcoholic hydrogen chloride. The precipitate of β-(β-hydroxyethyl-methylamino) ethyl phenothiazine - 10 - carboxylate hydrochloride is separated and recrystallized from isopropanol. It melts at 172–173° C.

β-Di - n - butylaminoethyl phenothiazine - 10-carboxylate is made by the foregoing method from 23 parts of β-chloroethyl phenothiazine-10-carboxylate and 26 parts of di-n-butylamine in 100 parts of methyl ethyl ketone containing 1 part of potassium iodide. It forms a solid hydrochloride on treatment with dry hydrogen chloride in absolute ether. A sample of this salt on analysis showed 8.04% chlorine; the calculated value is 8.16%.

*Example 4*

A solution of 261 parts of phenothiazine-10-carboxylic acid chloride and 115 parts of 1-methyl-4-piperidinol in 4500 parts of benzene is refluxed for about 15 hours. On chilling a solid precipitate forms. The reaction mixture is extracted with dilute muriatic acid. The acid extract is made alkaline and the precipitate of 1-methyl-4-piperidinyl phenothiazine-10-carboxylate is collected on a filter, washed and dried. The basic ester can be recrystallized from petroleum ether. It has the following formula

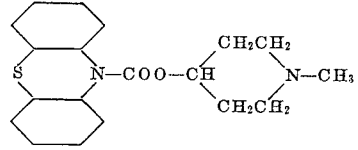

7 parts of the above base and 4 parts of anhydrous citric acid dissolved in the minimum amount of hot isopropanol on chilling form the crystalline citrate which melts at 172–173° C.

β - Diethylaminopropyl phenothiazine - 10-carboxylate is produced as above from 130 parts of phenothiazine-10-carboxylic acid chloride and 65 parts of β-diethylaminopropanol in 2000 parts of dry benzene. It forms a noncrystalline citrate which is soluble in water and alcohol.

*Example 5*

905 parts of acridan and 715 parts of β-chloroethyl chlorocarbonate (also known as chloroformate) in 8700 parts of dry toluene are refluxed for about 15 hours. The hot solution is then treated with activated charcoal, filtered and evaporated. A greenish residue of β-chloroethyl acridan-10-carboxylate is crystallized from alcohol and melts at 106–108° C.

286 parts of β-chloroethyl acridan-10-carboxylate and 200 parts of dimethylamine in 800 parts of methyl ethyl ketone containing 10 parts of potassium iodide are heated at 65° C. for four to five days in a closed vessel. The reaction mixture is then evaporated at steam temperature to remove excess amine and solvent. The residue is treated with a solution of hydrogen chloride in anhydrous ether and the yellow precipitate of β-dimethylaminoethyl acridan-10-carboxylate hydrochloride is collected on a filter, washed and dried. It melts at 204–205° C. The base has the formula

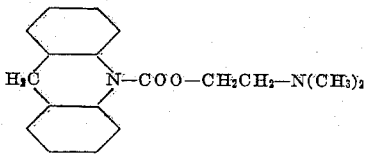

Example 6

A solution of 286 parts of β-chloroethyl acridan-10-carboxylate and 225 parts of β-methylaminoethanol in 1600 parts of methyl ethyl ketone containing 10 parts of potassium iodide is refluxed for three days and then evaporated to remove most of the solvent. The residue is treated with dilute muriatic acid and a mixture of ether and benzene. The aqueous layer is separated, made alkaline and extracted with ether. The ether extract is dried and evaporated leaving a residue of β-(β-hydroxyethylmethylamino)-ethyl acridan-10-carboxylate as a thick oil. This basic ester is dissolved in benzene and ether, treated with decolorizing charcoal, filtered and reacted with an equivalent of hydrogen chloride in absolute alcohol. The precipitate of the hydrochloride is removed, triturated with hot isopropanol, collected on a filter and dried. It melts at 174–175° C.

Example 7

A solution of 305 parts of β-chloroethyl phenothiazine-10-carboxylate, 142 parts of pyrrolidine and 10 parts of potassium iodide in 800 parts of methyl ethyl ketone is refluxed for three days, then evaporated to remove most of the solvent. The residue is chilled, diluted with muriatic acid and mixed with ether. A heavy precipitate of the hydrochloride of β-pyrrolidinoethyl phenothiazine-10-carboxylate forms. This is collected on a filter, dried and then recrystallized from alcohol using decolorizing charcoal. This salt melts at 220–221° C. (with decomposition).

β-Morpholinoethyl phenothiazine-10-carboxylate is produced as above from 61 parts of β-chloroethyl phenothiazine-10-carboxylate and 174 parts of morpholine in 165 parts of methyl ethyl ketone containing 2 parts of sodium iodide. It forms a solid hydrochloride when reacted in ether with absolute alcoholic hydrogen chloride. A sample of this salt on analysis showed 8.96% chlorine; the calculated value is 9.04%.

Example 8

To a solution of 84 parts of tetrahydroisoquinoline in 400 parts of dry ether at 0° C. is added slowly a solution of 43 parts of β-chloroethyl chlorocarbonate in 300 parts of dry ether. After the addition the mixture is agitated at low temperature for two hours and then diluted with anhydrous benzene. The cold mixture is then filtered and the filtrate is evaporated leaving a residue of β-chloroethyl tetrahydroisoquinoline-2-carboxylate. 70 parts of this ester are added to a cold solution of 35 parts of dimethylamine and 1 part of potassium iodide in 80 parts of methyl ethyl ketone. The resulting solution is heated in a closed vessel for three days at 60–70° C. The solvent is then removed from the reaction mixture by evaporation and the residue is treated with ice, hydrochloric acid and ether with good agitation. The aqueous layer is separated, made alkaline, extracted with ether and the ether extract dried and evaporated. The residue of β-dimethylaminoethyl tetrahydroisoquinoline-2-carboxylate distills at 186–189° C. at 5 mm. pressure. It forms a crystalline hydrochloride when treated with hydrogen chloride in dry alcohol. This salt is hygroscopic and does not give a definite melting point. The basic ester also forms a non-crystalline citrate when treated with an equivalent of anhydrous citric acid.

10 parts of β-dimethylaminoethyl tetrahydroisoquinoline-2-carboxylate and 23 parts of methyl iodide are dissolved in 60 parts of cold methyl ethyl ketone. A solid precipitate of the methiodide forms at once. This salt melts at 167–168° C.

Example 9

A solution of 133 parts of tetrahydroquinoline in 500 parts of anhydrous ether is cooled to 0° C. and to it is added a solution of 71.5 parts of β-chloroethyl chlorocarbonate in 500 parts of dry ether. After the addition the mixture is agitated for three hours at 0° C. and then filtered. The filtrate is evaporated yielding a residue of β-chloroethyl tetrahydroquinoline-1-carboxylate. 60 parts of this ester, 30 parts of dimethylamine and 1 part of potassium iodide are dissolved in 60 parts of cold methyl ethyl ketone and the resulting solution is heated in a closed vessel at 80° C. for two days. The β-dimethylaminoethyl tetrahydroquinoline-1-carboxylate is isolated as in Example 8. It distills at 192–195° C. at 8 mm. pressure and forms a crystalline hydrochloride which melts at 157–159° C.

10 parts of β-dimethylaminoethyl tetrahydroquinoline-1-carboxylate and 23 parts of methyl iodide are dissolved in 60 parts of methyl ethyl ketone and allowed to stand at 0° C. for fifteen hours, during which time a crystalline precipitate of the methiodide forms. This is collected on a filter, washed with ether and dried. It melts at 131–133° C.

Example 10

A solution of 50 parts of β-chloroethyl phenothiazine-10-carboxylate, 42.5 parts of piperidine and 2 parts of potassium iodide in 250 parts of methyl ethyl ketone is refluxed for two days. The reaction mixture is then chilled and filtered. The filtrate is evaporated to remove solvent and the residue of β-piperidinoethyl phenothiazine-10-carboxylate is mixed with cold dilute hydrochloric acid and ether. A precipitate of β-piperidinoethyl phenothiazine-10-carboxylate hydrochloride forms. This is removed and recrystallized from alcohol. It melts at 122–124° C.

Example 11

A solution of 45 parts of β-chloroethyl phenothiazine-10-carboxylate, 40 parts of diethylamine and 2 parts of potassium iodide in 81 parts of methyl ethyl ketone is heated for 2½ days at 85° C. in a closed vessel. The β-diethylaminoethyl phenothiazine is separated as in Example 1. An ether solution of this basic ester is treated with charcoal at reflux temperature, filtered, chilled and treated with anhydrous hydrogen chloride in absolute alcohol. The crystalline precipitate of the hydrochloride of β-diethylaminoethyl phenothiazine-10-carboxylate is separated, collected on a filter, dried and recrystallized from isopropanol using decolorizing charcoal. It melts at 159–160° C.

16 parts of β-diethylaminoethyl phenothiazine-10-carboxylate and 34.5 parts of methyl iodide in 60 parts of methyl ethyl ketone are heated in a closed vessel at 80° C. for fifteen minutes. The reaction mixture is allowed to stand for several days at room temperature and then the crystalline methiodide is removed by filtration and dried. It melts at 217–218° C. with decomposition.

Example 12

To a solution of 716 parts of dodecahydrocarbazole in 3500 parts of dry ether at 0° C. is added slowly with good agitation a solution of 286 parts of β-chloroethyl chlorocarbonate in 3500 parts of dry ether. After the addition the reaction mixture is agitated for two hours at low temperature and then filtered. The filtrate is evaporated leaving a residue of β-chloroethyl dodecahydrocarbazole-9-carboxylate. 80 parts of the chloro ester are dissolved in a cold solution of 40 parts of dimethylamine and 2 parts of potassium iodide in 80 parts of methyl ethyl ketone. The resulting solution is heated in a closed vessel for 2½ to 3 days at 80° C. Part of the solvent is evaporated and the residue is mixed with ice, ether and muriatic acid. The aqueous layer is separated, made alkaline, extracted with ether and the ether extract is dried and distilled. β-dimethylaminoethyl dodecahydrocarbazole-9-carboxylate distills at 153–156° C. at 1.5 mm. pressure. It forms a crystalline hydrochloride melting at 124–126° C. The base has the formula

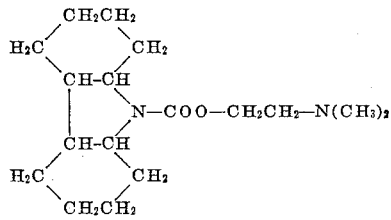

15 parts of β-dimethylaminoethyl dodecahydrocarbazole - 9 - carboxylate and 35 parts of methyl iodide in 80 parts of methyl ethyl ketone at 0–5° C. are allowed to stand for about 15 hours. The precipitate of the methiodide is removed by filtration. It is a hygroscopic solid melting at 185–186° C.

Example 13

β-Chloroethyl tetradecahydroacridine-10-carboxylate is made by the method of Example 12 from 680 parts of tetradecahydroacridine and 243 parts of β-chloroethyl chlorocarbonate. 50 parts of this ester are reacted with 40 parts of diethylamine in 80 parts of methyl ethyl ketone containing 2 parts of potassium iodide as in Example 11. There is thus produced β-diethylaminoethyl tetradecahydroacridine-10-carboxylate which is isolated by the method of Example 12 and which distills at 192–195° C. at 1 mm. pressure. It forms a crystalline hydrochloride which melts at 177–178° C. after recrystallization from a mixture of isopropanol and ether. The base has the formula

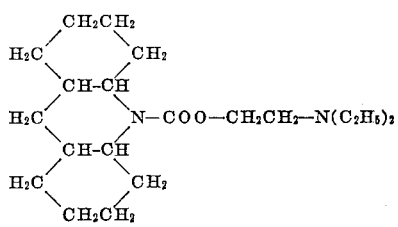

Example 14

15 parts of β-pyrrolidinoethyl phenothiazine-10-carboxylate (Example 7) are dissolved in 40 parts of warm methyl ethyl ketone, treated with decolorizing charcoal, and filtered. The filtrate is cooled to 20° C. and a stream of methyl bromide is passed in until 12 parts are taken up. The reaction mixture becomes warm and an oily precipitate of the methobromide forms. The reaction mixture is kept at 0° to 5° C. for three days during which time the precipitate of β-pyrrolidinoethyl phenothiazine-10-carboxylate methobromide crystallizes. This is separated, washed with ether and dried. It melts at 200–201° C.

The crystalline ethobromide of β-pyrrolidinoethyl phenothiazine-10-carboxylate is made as above from 23 parts of the basic ester, 29 parts of ethyl bromide and 80 parts of methyl ethyl ketone. It is a crystalline solid melting at 215–216° C.

Example 15

A solution of 261 parts of phenothiazine-10-carboxylic acid chloride and 105 parts of δ-dimethylaminobutanol in 4000 parts of dry benzene is refluxed for 12 hours. The reaction mixture is agitated with dilute muriatic acid and the acid layer separated. The latter is made alkaline and the δ-dimethylaminobutyl phenothiazine-10-carboxylate is extracted with ether. The ether extract is washed thoroughly with water, dried and evaporated to remove the bulk of the solvent. The residue is mixed with an equivalent of dry hydrogen chloride in absolute ether and chilled. The precipitate of δ-dimethylaminobutyl phenothiazine-10-carboxylate hydrochloride is separated and dried. A sample on analysis showed 9.32% chlorine; the calculated value is 9.36%.

Example 16

A solution of 150 parts of β-chloroethyl phenothiazine-10-carboxylate, 100 parts of N-methylpiperazine in 2600 parts of dry toluene is refluxed for 15 hours. The solution is decanted from the solid precipitate and extracted with dilute hydrochloric acid. The aqueous extract is made alkaline and the solid precipitate of β-(1-methyl-4-piperazino)-ethyl phenothiazine-10-carboxylate is removed by filtration and crystallized from alcohol. On treatment with hydrogen chloride in a mixture of absolute ether and absolute alcohol it forms a crystalline hydrochloride melting at 258–260° C.

Example 17

A solution of 91 parts of phenoxazine and 71 parts of β-chloroethyl chlorocarbonate in 450 parts of dry toluene is refluxed for about 24 hours. The hot solution is filtered and evaporated. The residue of β-chloroethyl phenoxazine-10-carboxylate is dissolved in 500 parts of methyl ethyl ketone containing 5 parts of potassium iodide. To the solution are added 85 parts of piperidine and the solution is refluxed for 20 hours. It is filtered and evaporated. The residue of β-piperidinoethyl phenoxazine-10-carboxylate is triturated with water and crystallized from petroleum ether. A sample on analysis showed 8.16% nitrogen; the calculated value is 8.28%.

Example 18

13 parts of β-diethylaminopropyl phenothiazine-10-carboxylate (Example 4) and 35 parts of methyl iodide are dissolved in 60 parts of methyl ethyl ketone and heated at 60–70° C. for 15 hours. The solution is chilled and diluted with dry ether. On standing at 0° C. a crystalline precipitate of the methiodide forms. This is separated and recrystallized from a mixture of isopropanol and ether. The methiodide of β-diethylaminopropyl phenothiazine-10-carboxylate melts at 194–195° C.

I claim:

1. A member of the class consisting of a basic ester and quaternary ammonium and acid addition salts thereof, said basic ester having the formula

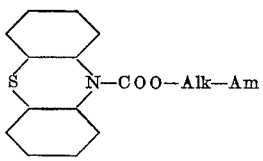

wherein Alk is a lower alkylene radical and Am is an amino radical selected from the class consisting of di(lower alkyl)amino, (lower alkyl)-(lower hydroxyalkyl) amino and saturated, monocyclic, heterocyclic amino radicals attached to Alk through nitrogen and containing oxygen and nitrogen as the sole hetero elements.

2. A salt of a basic ester of the formula

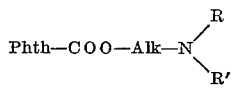

wherein Phth is a 10-phenothiazinyl radical, Alk is a lower alkylene radical, and R and R' are lower alkyl radicals.

3. A salt of a basic ester of the formula

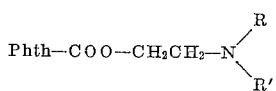

wherein Phth is a 10-phenothiazinyl radical and R and R' are lower alkyl radicals.

4. A salt of β-diethylaminoethyl phenothiazine-10-carboxylate.

5. β-Diethylaminoethyl phenothiazine-10-carboxylate hydrochloride.

6. A salt of β-pyrrolidinoethyl phenothiazine-10-carboxylate.

7. β-pyrrolidinoethyl phenothiazine - 10 - carboxylate hydrochloride.

JOHN W. CUSIC.

References Cited in the file of this patent

UNITED STATES PATENTS

| Number | Name | Date |
|---|---|---|
| 2,089,985 | Ruigh | Aug. 17, 1937 |
| 2,170,037 | Semon | Aug. 22, 1939 |

OTHER REFERENCES

Nemets et al., Chem. Abs., vol. 38 (1944), p. 1507.

Cheney et al., Jour. Amer. Chem. Soc., vol. 64 (1942), pp. 970–973.

Burtner et al., Jour. Amer. Chem. Soc., vol. 65 (1943), pp. 1582–1585.

Knoefen, Jour. Pharm., vol. 47 (1933), pp. 69 and 70.

Idson, "Chem. Reviews," vol. 47, p. 493 (1950).